(12) United States Patent
Matsumoto et al.

(10) Patent No.: US 7,447,249 B2
(45) Date of Patent: Nov. 4, 2008

(54) LIGHTING SYSTEM

(75) Inventors: Takahiro Matsumoto, Tokyo (JP);
Masayuki Kanechika, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/464,325

(22) Filed: Aug. 14, 2006

(65) Prior Publication Data
US 2007/0041417 A1   Feb. 22, 2007

(30) Foreign Application Priority Data
Aug. 19, 2005   (JP) ............................. 2005-239038
Apr. 25, 2006   (JP) ............................. 2006-120095

(51) Int. Cl.
*H01S 3/093* (2006.01)
(52) U.S. Cl. .............................. 372/72; 372/82; 372/92; 372/64; 372/55
(58) Field of Classification Search ................... 372/55, 372/72, 82, 92, 64
See application file for complete search history.

(56) References Cited

U.S. PATENT DOCUMENTS

| | | | | |
|---|---|---|---|---|
| 5,606,571 | A * | 2/1997 | Furuya et al. | 372/82 |
| 5,781,579 | A * | 7/1998 | Choo et al. | 372/64 |
| 2005/0105581 | A1 * | 5/2005 | Seguin et al. | 372/64 |
| 2005/0259705 | A1 * | 11/2005 | Goto et al. | 372/41 |
| 2006/0137613 | A1 * | 6/2006 | Kasai | 118/723 MW |

FOREIGN PATENT DOCUMENTS

| JP | 62248273 | * 10/1987 |
|---|---|---|
| JP | 01-200684 | 8/1989 |

OTHER PUBLICATIONS

Laser Handbook, Jun. 20, 1988 (First Edition, Second Reprint), Ohmsha, Ltd. p. 206, p. 299 (Discussed on p. 2 of specification, English abstract included).
Tokyo Instruments, Inc. product information, http://www.tokyoinst.co.jp/products/milli, (Discussed on pp. 3-4 of specification, English abstract included).

* cited by examiner

*Primary Examiner*—Minsun Harvey
*Assistant Examiner*—Patrick Stafford
(74) *Attorney, Agent, or Firm*—Rankin, Hill & Clark LLP (57) ABSTRACT

A lighting system includes a microwave resonator (2) for generating a standing microwave in the internal space, and a gas cell (6) enclosing a medium is disposed in the internal space of the microwave resonator 2. The lighting system excites the medium in the gas cell (6) by the standing microwave to generate light. The gas cell (6) is replaceably mounted on the microwave resonator (2). The generated light is output to the outside of the microwave resonator (2) through a light lead-out hole (26). Thereby, it is possible to provide a lighting system (including a gas laser) capable of emitting light efficiently with a compact and inexpensive device configuration and of achieving a long life. Moreover, it can also be used as a lighting system in the THz-wave region by enclosing the medium for generating light in the far-infrared region in the gas cell (6).

16 Claims, 5 Drawing Sheets

LIGHTING SYSTEM

BACKGROUND OF THE INVENTION

1. Field of the Invention

The present invention relates to a lighting system for generating light by exciting a medium such as gas or vapor, and more particularly to a lighting system that can be used also as a lighting system in the ultraviolet, infrared, and far-infrared regions.

2. Description of the Related Art

There is generally known a gas laser as a lighting system for generating light by exciting a medium such as gas or vapor. In this specification, the "light" is not limited to visible light, but includes an electro-magnetic wave in a region other than the visible light (for example, the infrared region, far-infrared region, and ultraviolet region). More specifically, the "light" generated by the lighting system in this specification means an electro-magnetic wave having a wavelength that can be generated by medium excitation (the electro-magnetic wave depends upon the type of the medium).

Regarding techniques of exciting a medium in the gas laser or a laser medium, generally discharge excitation, electron beam excitation, and optical pumping techniques are already known as described, for example, in "Laser Handbook, 1st Edition, 2nd Printing (Chapter 15)/Issued by Ohmsha" (hereinafter, referred to as Nonpatent Document 1). As a technique using the discharge excitation among them, there is already known a gas laser disclosed, for example, in Japanese Patent Laid-Open No. Hei 1-200684 (hereinafter, referred to as Patent Document 1).

A gas laser using the discharge excitation generates a gaseous discharge from a discharge electrode into a laser tube to excite a laser medium by its discharge energy.

A gas laser using the electron beam excitation (for example, an excimer laser) applies a high voltage to a cathode (negative electrode) disposed in vacuum to release a beam of electrons accelerated at high speed (for example, electrons accelerated at 300 kV to 2 MV). It then causes the electron beam to impinge on a laser medium (KrF, XeF, or other gases) through a metallic thin film to excite the laser medium by the energy of the electron beam.

Moreover, a gas laser using the optical pumping uses a laser ($CO_2$ laser and the like) as an excitation light source and excites a laser medium ($CH_3OH$ and the like) by means of the energy of the laser beam output from the excitation laser.

As additional information, there are already known various types of laser mediums for use in a gas laser (for example, refer to Appendix 4 of Nonpatent Document 1). The laser mediums include not only substances that are gaseous at room temperature (for example, He and Ne), but also substances that are solid or liquid at room temperature and are vaporized by heating at laser oscillation (for example, Cd and other metals, and $H_2O$). The medium of the lighting system in this specification is a substance that is a gas or vapor at least when the light is generated (including mixed substances).

On the other hand, light in the far-infrared region (including a laser beam) is expected to be applied to imaging electro-magnetic waves that can be substituted for X rays and the demand for the lighting system in the far-infrared region are increasing. The far-infrared region generally ranges in wavelengths from 10 μm to 1000 μm.

In this instance, the gas laser can output a laser beam at various wavelengths including light in the far-infrared region according to the type of the medium (laser medium) and therefore in recent years it attracts attention as a lighting system in the THz-wave region (included in the far-infrared region).

Furthermore, as a simple and compact lighting system in the THz-wave region, a backward wave oscillator (BWO), namely a backward-wave tube is generally known as described on the Internet webpage "Tokyo Instruments, Inc., 'Submillimeter Wave, Terahertz Products Lineup—Terahertz BWO Tube and Power Supply'" [online], [Searched for on Sep. 16, 2005] (URL: http://www.tokyoinst.co.jp/products/milli). This BWO releases an electron beam by applying a voltage to a heated cathode (negative electrode) and releases light in the THz-wave region by focusing the electron beam in the magnetic field and passing the focused electrons through a comb-like interdigital circuit.

Regarding the gas laser using the discharge excitation, particularly using metal vapor (for example, Cd, Zn, Se, or Cu vapor) as a laser medium (metal vapor laser), vaporized metal is deposited on the discharge electrode (negative or positive electrode) for causing a discharge, or sputtering of the discharge electrode occurs due to the metal vapor. They easily lead to deterioration or damage of the discharge electrode and a decrease in output power caused by contamination of the laser medium. Even in a gas laser not using metal vapor (for example, a He—Ne laser) among those using the discharge excitation, sputtering of the discharge electrode through an ionized gas occurs and it easily leads to deterioration or damage of the discharge electrode. Since the gas laser using the discharge excitation is susceptible to deterioration or damage of the discharge electrode as just described, it has required frequent replacement of a laser tube (gas tube) including the discharge electrode (for example, replacement after it has been used for 1000 hours). Moreover, the replacement has conventionally required a large cost in general. Furthermore, the metal vapor laser requires a heater for heating and vaporizing metal and therefore the gas laser tends to grow in size disadvantageously.

Regarding the gas laser using the electron beam excitation, there is a need to accelerate an electron beam at high speed to pass it through the metallic thin film and therefore it requires a high power supply, which is large in size and expensive. Furthermore, a gas pressure of the laser medium need be previously increased to some extent in order to facilitate the efficient energy reception from the electron beam to the laser medium. This causes a relatively large difference in pressure (for example, 1 atm pressure) between a vacuum chamber where the cathode is disposed and a gas chamber where the laser medium is enclosed. This difference in pressure easily deteriorates or damage the metallic thin film forming a partition wall between the vacuum chamber and the gas chamber. Consequently, it has required the frequent replacement of a gas tube including the metallic thin film.

Furthermore, regarding the gas laser using the optical pumping, a laser is used as an excitation light source and therefore the entire gas laser is large in size and expensive. In addition, the laser medium is excited by a laser beam, which leads to a low energy conversion efficiency disadvantageously. Moreover, the life of the laser as the excitation light source is as short as 1000 to 5000 hours or so Therefore, it has been required to frequently replace the excitation light source.

The conventional gas lasers have disadvantages that the life is relatively short, which easily leads to a high running cost. Furthermore, they also have a disadvantage such that the device configuration increases in size or cost according to the method of exciting the laser medium. This disadvantage similarly occurs in generating a laser beam in the THz-wave region by using a gas laser.

Moreover, although the BWO as a lighting system in the THz-wave region is simple and compact, it is necessary to apply a high voltage to the cathode to release electrons and to heat the cathode in order to release the electrons efficiently. For this reason, it is susceptible to deterioration or damage in the cathode. Therefore, the BWO has a disadvantage that the life is relatively short (for example, 500 to 1000 hours or so), which easily leads to high running cost disadvantageously, similarly to the gas lasers.

The present invention has been provided in view of the background described above. Therefore, it is an object of the present invention to provide a lighting system (including a gas laser) capable of emitting light efficiently with a compact and inexpensive device configuration and of achieving a long life. In addition, it is an object of the present invention to provide a lighting system also usable as a lighting system in the ultraviolet, infrared, and far-infrared regions.

SUMMARY OF THE INVENTION

According to one aspect of the present invention which achieves these objects, a lighting system for generating light by exciting a medium such as gas or vapor, comprises: a microwave resonator having an internal space for generating a standing microwave; microwave supply means for supplying the microwave into the internal space of the microwave resonator; and a gas cell enclosing the medium and disposed in the internal space of the microwave resonator, wherein the light is generated by exciting the medium in the gas cell using the standing microwave generated in the internal space of the microwave resonator and wherein the generated light is output to the outside of the microwave resonator through a light lead-out hole provided in the microwave resonator.

According to the present invention, the microwave supplied from the microwave supply means to the microwave resonator is resonated in the internal space of the microwave resonator to generate the standing microwave in the internal space. Then, the light is generated by exciting the medium in the gas cell disposed in the internal space of the microwave resonator using the standing microwave. Furthermore, the generated light passes through the light lead-out hole and is output to the outside of the microwave resonator. At this point, the medium in the gas cell is excited using the standing microwave enclosed in the internal space of the microwave resonator. Therefore, the medium in the gas cell can be efficiently and stably excited to generate the light only with the energy of the standing microwave without a need for discharge energy or the like. Moreover, the electro-magnetic field strength can be extremely increased (for example, the Q-value is 12000) in the microwave resonator and therefore a medium in the gas cell can be excited efficiently with an input of low microwave power. Although the medium in the gas cell may be solid or liquid at room temperature depending on the medium type, no dedicated heater is needed for the medium, because it is vaporized and excited by the energy of the standing microwave.

As described above, there is no need to prepare any discharge electrode or heater for the gas cell by using the microwave for exciting the medium in the present invention. In other words, basically the gas cell only need have a function as an enclosure of the medium. Note that, however, the medium in the gas cell is excited by the microwave in the present invention and therefore the gas cell need have transparency to the microwave employed. In addition, the gas cell also need have a part transmitting the light generated inside the gas cell in order to output the light to the outside of the gas cell. Furthermore, since the gas cell is heated by the microwave together with the inside medium, it is required to have a heat resistance to some extent. Still further, the gas cell is required to be unresponsive or hardly responsive to the medium excited inside the gas cell. The gas cell satisfying these requirements can be easily formed of quartz glass or the like. Moreover, the gas cell does not require a discharge electrode or other parts easily deteriorated or damaged by the deposition of metal vapor or sputtering, and therefore it is hardly damaged or deteriorated even if the light generation is repeated.

Moreover, the microwave for use in exciting the medium is generally an electro-magnetic wave having a wavelength of 1 m to $10^{-4}$ m or so and therefore the size of the microwave resonator can be of the comparative order with the wavelength of the microwave. Furthermore, the microwave supply means can be an inexpensive and compact known power device. Particularly, a solid-state microwave oscillator and a solid-state microwave amplifier are effective as inexpensive and compact microwave power devices.

Therefore, according to the present invention, the lighting system can be compact and inexpensive in device configuration and can generate light by exciting the medium efficiently. Furthermore, it is possible to provide a long-life lighting system in comparison with the conventional gas laser, BWO, and other lighting systems.

While the microwave is an electro-magnetic wave having a wavelength of 1 m to $10^{-4}$ m or so, it is also possible to excite the laser medium by using an electro-magnetic wave having a longer wavelength than the microwave or an electro-magnetic wave having a shorter wavelength than the microwave in principle. If the wavelength of the electro-magnetic wave, however, is longer than the microwave (for example, an electro-magnetic wave in the VHF band), a resonator for generating the electro-magnetic standing wave is too large in size and the gas laser need be configured into a large scale system. Furthermore, if the wavelength of the electro-magnetic wave is shorter than the microwave (for example, an infrared ray), a resonator for generating the electro-magnetic standing wave is too small in size to house the gas cell impractically. Therefore, if the resonator structure is adopted for exciting the medium, the microwave is appropriate for use in the structure.

In the present invention, the light lead-out hole can be formed to have a diameter of the order that the microwave in the internal space of the microwave resonator does not pass through. The diameter of the light lead-out hole only need be set to a value smaller than $\lambda c/2$ where $\lambda c$ is the cutoff wavelength of the microwave resonator.

In the present invention, preferably the gas cell is disposed in the position corresponding to the maximum electric field strength of the standing wave in the internal space of the microwave resonator or in the vicinity of the position.

According to this, the medium can be excited by supplying the maximum energy from the standing microwave enclosed in the internal space of the microwave resonator to the medium in the gas cell, thereby achieving efficient excitation of the medium.

More specifically, regarding the gas cell disposed position in the axial direction of the microwave resonator (in the traveling direction of the standing microwave), preferably the gas cell is disposed in a position, or in the vicinity thereof, a distance of $(\lambda g/2) \cdot (n+(1/2))$ (n:0 or greater integer) from the position corresponding to zero electric field strength of the standing microwave at one end of the internal space of the microwave resonator, where λg is a guide wavelength as the wavelength of the standing microwave in the internal space of the microwave resonator.

More specifically, the electric field strength of the standing wave is maximum in the position at a distance of (λg/2)·(n+(½)) from the position corresponding to zero electric field strength of the standing microwave in the traveling direction of the standing microwave in the internal space of the microwave resonator (in the longer direction of the guide wavelength). Therefore, by disposing the gas cell in this position, energy can be efficiently supplied to the medium in the gas cell by the standing microwave and the medium can be efficiently excited.

Furthermore, regarding the gas cell disposed position on the plane perpendicular to the axial direction of the microwave resonator (on the cross section of the internal space of the microwave resonator), the electro-magnetic field mode of the standing microwave in the internal space of the microwave resonator is a mode in which the electric field strength is constant in a single direction on a cross section of the internal space of the microwave resonator and in which the electric field strength varies in a direction perpendicular to the single direction on the cross section, and therefore preferably the gas cell is disposed in the internal space of the microwave resonator, with the central axis directed to the single direction and in such a way that the central axis of the gas cell exists in the position corresponding to the maximum electric field strength in the direction perpendicular to the single direction.

According to this, the electric field of the standing microwave does not change in the central axis direction of the gas cell (in the longitudinal direction of the gas cell) and the electric field strength on the central axis of the gas cell is maximum in the direction perpendicular to the single direction (or in the direction perpendicular to the central axis of the gas cell), and therefore the medium in the gas cell can be equally and efficiently heated and excited. Therefore, the light can be stably generated by exciting the medium.

Moreover, according to the present invention, the gas cell can be provided in a plural number. If a plurality of gas cells are provided, the gas cells can be disposed in positions corresponding to the maximum electric field strength of the standing wave in the internal space of the microwave resonator or in the vicinity of the positions, with being spaced from each other in the central axis direction of the internal space. For example, as described above, the gas cells can be disposed in the positions at a distance of (λg/2)·(n+(½)) from the position corresponding to zero electric field strength of the standing microwave (the positions of the gas cells spaced apart from the position by different distances).

Alternatively, the gas cells can be disposed in a line on a cross section of the internal space of the microwave resonator in the positions corresponding to the maximum electric field strength of the standing wave in the internal space or in the vicinity of the positions. In this case, for example, the gas cells can be disposed in the positions at a distance of (λg/2)·(n+(½)) from the position corresponding to zero electric field strength of the standing microwave as described above (the positions of the gas cells spaced apart from the position by the same distance).

With the plurality of gas cells provided in this manner, for example, different types of mediums can be enclosed in the gas cells and thereby light of various wavelengths can be emitted.

If the electro-magnetic field mode of the standing microwave is the mode as described above, preferably the gas cells are disposed with the central axes directed to the single direction and in such a way that the central axes of the gas cells exist in the positions corresponding to the maximum electric field strength in the direction perpendicular to the single direction.

Moreover, in the present invention, preferably the microwave resonator has at least one short plate for adjusting a cavity length, which is the length of the internal space in the traveling direction of the standing microwave.

According to this, the standing microwave can be generated in the internal space of the microwave resonator independently of the type of the medium in the gas cell. More specifically, the guide wavelength of the standing microwave varies in some degree according to the thickness or material of the gas cell in the internal space of the microwave resonator and the type of the medium in the gas cell even if the frequency of the microwave is constant. In this instance, the standing microwave can be surely generated in the internal space of the microwave resonator by adjusting the cavity length using the short plate in such a way that the cavity length is an integral multiple of a half guide wavelength of the standing microwave.

The short plate can be placed movably in the axial direction of the microwave resonator with the normal line of the short plate along the axial direction of the microwave resonator. In this case, for example, the short plate can be supported by the end of a rod inserted into the internal space from the outside of the microwave resonator so that the short plate is movable in the axial direction of the microwave resonator with the short plate passing through the axial end of the microwave resonator.

Furthermore, in the present invention, preferably the gas cell is replaceably mounted on the microwave resonator. According to this, it is possible to change the type of the medium and to change the wavelength of the generated light to a desired wavelength only by replacing the gas cell in a state of keeping a plurality of types of gas cells whose mediums enclosed therein are different from each other.

To achieve the replaceable gas cell, for example, the microwave resonator is divisibly structured in advance and both ends of the gas cell are detachably held in the microwave resonator through appropriate hold members.

Furthermore, in the present invention, preferably the microwave supply means includes a microwave oscillator for outputting at least the microwave and an isolator interposed between the microwave oscillator and the microwave resonator, wherein the microwave supply means supplies the microwave resonator with the output from the microwave oscillator via the isolator.

According to this, even in the case of occurrence of a return electro-magnetic wave, which is to return from the internal space of the microwave resonator to the microwave oscillator, in adjusting the cavity length of the microwave resonator, the isolator blocks the return electro-magnetic wave. Therefore, it is possible to prevent the microwave oscillator from being damaged by the return electro-magnetic wave.

Although the microwave oscillator can be integrated with a microwave amplifier for amplifying microwave output, it can be separated from the microwave amplifier. If the microwave oscillator is separated from the microwave amplifier, the isolator is preferably disposed on the output side of the microwave amplifier (between the microwave amplifier and the microwave resonator). This prevents the microwave amplifier from being damaged by the return electro-magnetic wave as well as the microwave oscillator.

When a laser beam is output in the present invention described above, a laser resonator for resonating the light generated in the gas cell and oscillating the laser beam is mounted on the microwave resonator and the light lead-out hole is made in the microwave resonator on the optical axis of the laser beam.

This enables the laser beam to be output to the outside of the microwave resonator through the light lead-out hole. The laser resonator can be one having a known structure. For example, it is possible to form the simplest laser resonator by disposing a mirror totally reflecting the light generated in the gas cell and a mirror transmitting a part of the light and reflecting the remainder in such a way that they are opposite each other with the gas cell interposed therebetween. Although these mirrors can be disposed inside the microwave resonator in this case, it is preferable to dispose them outside the microwave resonator in adjusting tilts of the mirrors or a distance therebetween.

To output the light generated in the gas cell to the outside of the microwave resonator directly, the light lead-out hole is made in the microwave resonator in a position opposite the gas cell. This enables the light generated in the gas cell to be easily output to the outside of the microwave resonator through the light lead-out hole.

In this case, preferably a reflective coating layer that reflects the light generated in the gas cell is formed on an outer surface of the gas cell except for one end. The material of the reflective coating layer can be selected according to the frequency of the light to be generated in the gas cell (or the type of the medium).

Alternatively, the inner surface of the microwave resonator can be coated with a high reflectance metal film on which the light generated in the gas cell is reflected almost 100%. In this case, silver coating is effective for ultraviolet light and gold coating is effective for infrared or far-infrared light. As described above, higher intensity light can be output through the light lead-out hole by keeping the inside of the microwave resonator from incurring light absorption loss of the generated light.

According to this, the most part of the light can be output to the outside of the microwave resonator through the light lead-out hole from one end of the gas cell while the light generated in the gas cell is prevented from being released wastefully into the internal space of the microwave resonator. Therefore, it is possible to increase the power of light that can be output to the outside of the microwave resonator.

Furthermore, it is more preferable to mount a condenser lens for condensing the light, which is output through the light lead-out hole to the outside of the microwave resonator, on the microwave resonator in the place of the light lead-out hole. This enables the light output through the light lead-out hole to the outside of the microwave resonator to be condensed by the condenser lens before the light is released from the condenser lens. Therefore, the power of the released light can be increased. Particularly, when it is used with the reflective coating layer, the power of the released light can be increased more effectively.

Furthermore, in the present invention, the medium can be of the type of generating light in the far-infrared region, by which the lighting system can output light in the THz-wave region (including a laser beam). In this case, the medium is He, Ne, $CH_3OH$, $H_2O$ or $D_2O$ (D: Deuterium), HCCOH, HCN, and the like.

DETAILED DESCRIPTION OF THE PREFERRED EMBODIMENTS

Figure 1:
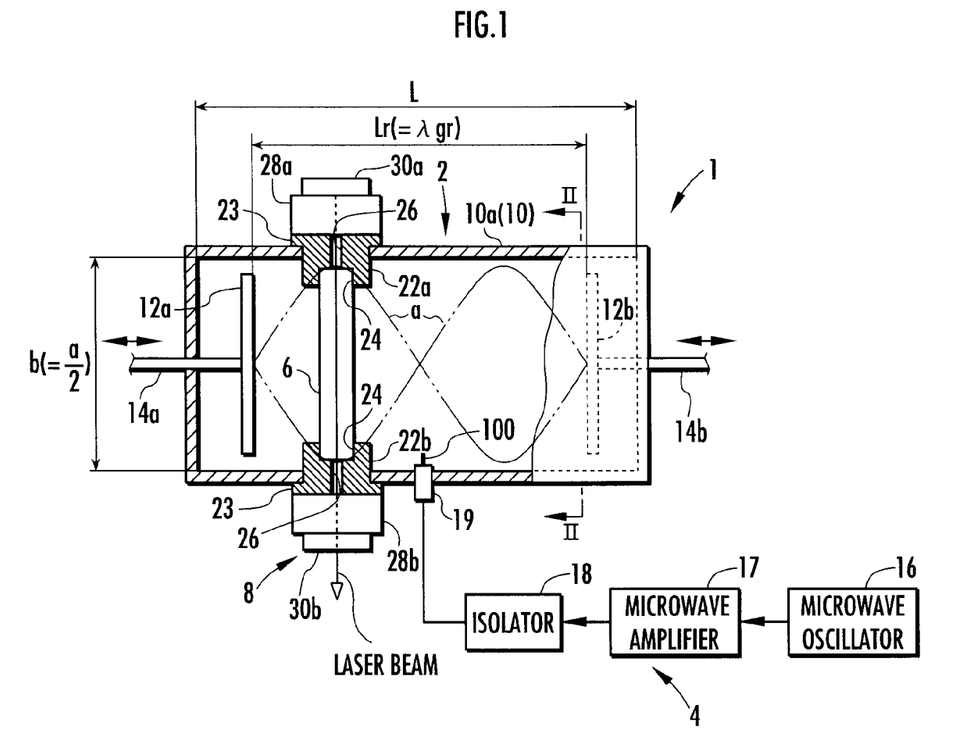
FIG. 1 is a diagram showing a configuration of a gas laser as a lighting system according to a first embodiment of the present invention.
Figure 2:
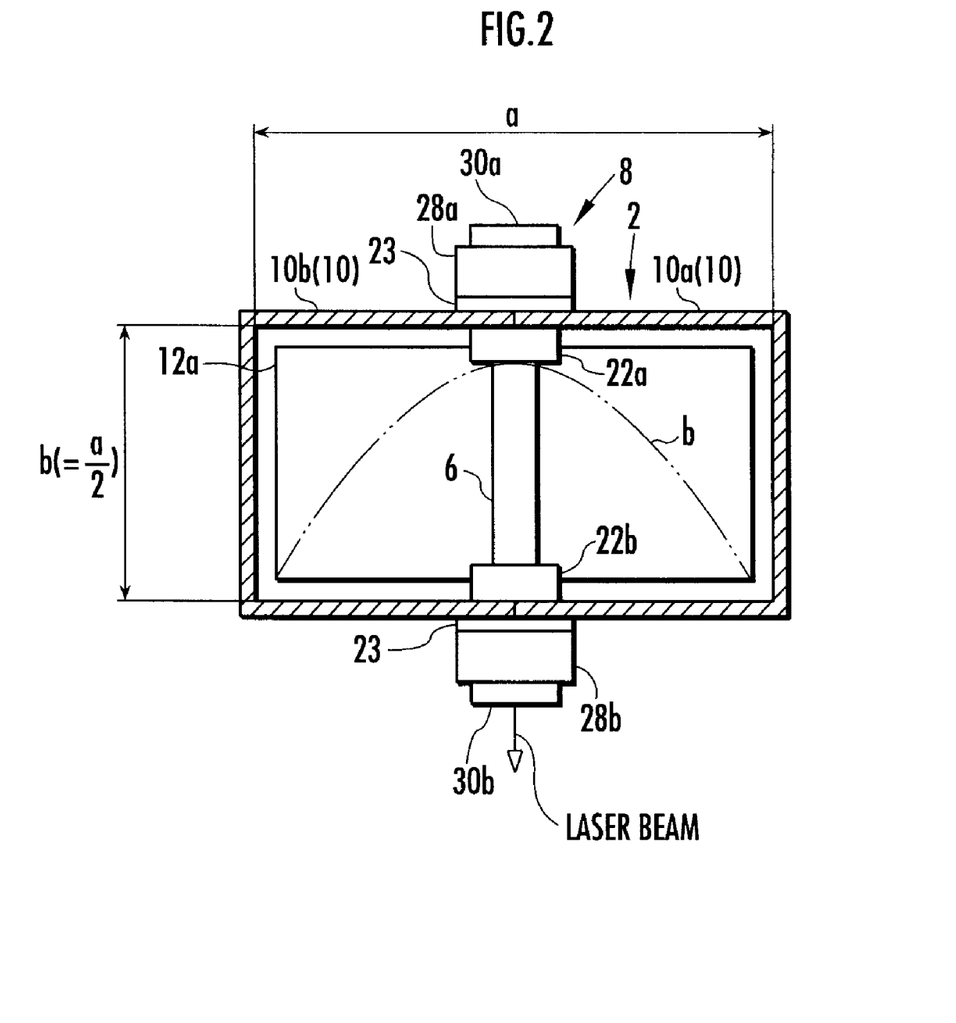
FIG. 2 is a cross section taken along line II-II of FIG. 1.

A first embodiment of the present invention will now be described in detail hereinafter with reference to FIG. 1 and FIG. 2. FIG. 1 shows a diagram showing a configuration of a gas laser as a lighting system according to the first embodiment of the present invention. FIG. 2 shows a cross section taken along line II-II of FIG. 1. In FIG. 1, the gas laser is shown on a partially broken view.

As shown in FIG. 1 and FIG. 2, the gas laser 1 as a lighting system according to this embodiment includes a microwave resonator 2, microwave supply means 4, a gas cell 6, and a laser resonator 8.

The microwave resonator 2 includes a resonator body 10 (a so-called cavity resonator) containing an enclosed space for generating a standing microwave inside and a pair of short plates 12a and 12b disposed in the resonator body 10 in order to adjust the cavity length of the microwave resonator 2. The resonator body 10 and the short plates 12a and 12b are formed of conductive material not transmitting a microwave such as, for example, brass or other metallic material. In the subsequent description, the right/left direction in FIG. 1 (the direction perpendicular to the surface of the page of FIG. 2) is assumed to be the axial direction (the longer direction) of the resonator body 10; the up/down direction in FIG. 1 (the up/down direction in FIG. 2) is assumed to be the vertical direction or the up/down direction of the resonator body 10; and the direction perpendicular to the surface of the page of FIG. 1 (the right/left direction in FIG. 2) is assumed to be the crosswise direction or the right/left direction of the resonator body 10.

The resonator body 10 has the structure of a waveguide with both ends closed (a so-called waveguide cavity resonator). The geometry and size (dimensions) of the resonator body 10 are generally determined according to the frequency or wavelength of the microwave resonated (the standing wave generated) in the resonator body 10 and to the electro-magnetic field mode of the standing microwave.

In this embodiment, the frequency of the microwave resonated in the microwave resonator 2 is, for example, 1 GHz, the electro-magnetic field mode of the microwave is, for example, a $TE_{102}$ mode, and the resonator body 10 is formed in a cuboid box shape (the shape of a so-called rectangular waveguide with both ends closed). A setting example of the size of the resonator body 10 will be described later.

As shown in FIG. 2, the resonator body 10 is composed of a half body 10a having a laterally-facing U-shaped cross section (the cross section perpendicular to the axial direction of the resonator body 10) and a half body 10b having a laterally-facing U-shaped cross section directed reversely to the half body 10a, which are joined to each other by fasteners such as screws not shown. Therefore, the resonator body 10 can be divided into two half bodies 10a and 10b by removing the fasteners. The parting face of the half bodies 10a and 11b has a normal line direction coincident with the crosswise direction of the resonator body 10 and includes the central axis of the resonator body 10. The internal space of the resonator body 10 encloses, for example, air. Note that, however, the internal space of the resonator body 10 can be vacuum or in a similar condition.

Subsequently, a setting example of the size of the resonator body 10 will be described below. As shown, it is assumed that "a" is the length of the resonator body 10 in the crosswise direction (specifically, the length of the internal space of the resonator body 10 in the crosswise direction), "b" is the length of the resonator body 10 in the vertical direction (specifically, the length of the internal space of the resonator body 10 in the vertical direction, and "L" is the axial length of the resonator body 10 (specifically, the axial length of the internal space of the resonator body 10). In addition, $\lambda c$ is assumed to be a cutoff wavelength of the microwave resonator 2. The length L is referred to as a cavity length of the resonator body 10.

In this embodiment, a:b=2:1 is assumed. Therefore, b=a/2 is satisfied. In this condition, the length "a" can be set in such a way as to achieve 2a=1.6$\lambda c$, for example. More specifically, supposing that the cutoff wavelength $\lambda c$ of the microwave resonator 2 is 25 cm, which is equivalent to the wavelength of a microwave of 1.2 GHz in vacuum (supposing that the cutoff frequency of the microwave resonator 2 is 1.2 GHz), the length "a" can be set to 20 cm or so.

Furthermore, it is assumed that $\lambda$ is the wavelength of a microwave resonated in the internal space of the resonator body 10 in vacuum or in air (a wavelength in a free space) and $\lambda g$ is the wavelength of the microwave in the axial direction of the resonator body 10 (a so-called guide wavelength, which is hereinafter referred to as resonator wavelength). In this condition, the relation expressed by the following equation (1) is satisfied between $\lambda g$ and $\lambda$:

$$\lambda g = \lambda / \sqrt{(1-(\lambda/2a)^2)} \quad (1)$$

In this instance, the frequency of the microwave is 1 GHz in this embodiment and therefore $\lambda$ is 30 cm. Accordingly, if "a" equals 20 cm as described above, $\lambda g$ of approx. 45 cm is achieved by the equation (1). To resonate the microwave (to generate the standing wave) in the resonator body 10, the cavity length L is basically set to the length of an integral multiple of $\lambda g/2$.

A gas cell 6, however, is disposed in the internal space of the resonator body 10 as described later. In this case, the microwave absorption is caused by the gas cell 6 or a laser medium inside thereof. The absorption degree depends upon the type of the laser medium in the gas cell 6. Furthermore, the dielectric constant of the gas cell 6 differs from the dielectric constant of a space other than the place where the gas cell 6 is disposed in the internal space of the resonator body 10 (the dielectric constant of air in this embodiment). Therefore, the actual resonator wavelength (hereinafter, referred to as actual resonator wavelength $\lambda gr$) is a little different from the value given by the equation (1).

Therefore, in this embodiment, the cavity length L of the resonator body 10 (the axial length of the internal space of the resonator body 10) is preset to a value slightly longer than the length of an integral multiple of one half of an expected actual resonator wavelength $\lambda gr$. For example, the cavity length L is preset to a value slightly longer than a double length (=$\lambda gr$) of $\lambda gr/2$. Thereby, a substantial cavity length (hereinafter, referred to as an actual cavity length Lr: See FIG. 1) of the microwave resonator 2 can be adjusted by using the short plates 12a and 12b.

The short plates 12a and 12b form reflective surfaces of the microwave resonated in the resonator body 10, instead of the wall surfaces at the axial both ends of the resonator body 10. Therefore, the distance between the short plates 12a and 12b in the axial direction of the resonator body 10 corresponds to the actual cavity length Lr of the microwave resonator 2. These short plates 12a and 12b are housed in the internal space of the resonator body 10 spaced from each other in the axial direction with the normal line direction along the axial direction of the resonator body 10 (in a position perpendicular to the axial direction of the resonator body 10). At the axial both ends of the resonator body 10, rods 14a and 14b are inserted slidably from the outside toward the inside of the resonator body 10. These rods 14a and 14b extend on the central axis of the resonator body 10 and are interposed between the half bodies 10a and 10b at the axial both ends of the resonator body 10. The short plates 12a and 12b are fixed to the tops of the rods 14a and 14b (the ends on the inside of the resonator body 10), respectively.

The short plates 12a and 12b are formed in a rectangular shape similarly to the cross section of the resonator body 10 and each outer circumference has a clearance from an inner wall surface of the resonator body 10. Furthermore, they are movable in the axial direction of the resonator body 10 integrally with the rods 14a and 14b. This movement enables the adjustment of the distance between the short plates 12a and 12b, namely the actual cavity length Lr. In this condition, the distance between the short plates 12a and 12b is previously adjusted in such a way that the actual cavity length Lr is a doubled $\lambda gr/2$, in other words, Lr equals $\lambda g$ in this embodiment.

In addition, although L is shown to be rather larger than Lr for convenience of illustration in FIG. 1, actually the difference between L and Lr is very small. Therefore, the short plates 12a and 12b are sufficiently close to the wall surfaces of the respective axial ends of the resonator body 10. Furthermore, although the pair of short plates 12a and 12b are provided to adjust the actual cavity length Lr of the microwave resonator 2 in this embodiment, only one of the short plates 12a and 12b can be provided, too.

Furthermore, the ratio between the crosswise length "a" and the vertical length "b" of the resonator body 10 is 2:1 in this embodiment, because a generally available rectangular waveguide is used for the resonator body 10.

Due to the above configuration of the microwave resonator 2, a standing wave having the electric field waveform as indicated by a curve "a" in FIG. 1 is formed in the axial direction of the resonator body 10 when a microwave (a microwave of 1 GHz in this embodiment) is introduced into the resonator body 10. More specifically, the standing wave has the electric field waveform having two loops in the axial direction of the resonator body 10. Therefore, the electric field strength of the microwave in the axial direction of the resonator body 10 is maximum in the position at a distance of (¼)$\lambda gr$ or (¾)$\lambda gr$ from one of the short plates 12a and 12b, for example, from the surface of the short plate 12a in the axial direction of the resonator body 10.

Since actually the short plates 12a and 12b are sufficiently close to the wall surfaces of the axial ends of the resonator body 10 as described above, the electric field strength of the microwave in the axial direction of the resonator body 10 is substantially maximum in the position at a distance of (¼)$\lambda gr$ or (¾)$\lambda gr$ from the wall surface at one axial end of the internal space of the resonator body 10 in the axial direction of the resonator body 10.

Additionally, although the actual cavity length Lr is equal to the actual resonator wavelength $\lambda gr$ in this embodiment, Lr can also be an integral multiple of λgr/2 as described above to resonate the microwave in the resonator body 10. In this case, the position of the maximum or almost maximum electric field strength of the microwave in the resonator body 10 in the axial direction of the resonator body 10 is generally at a distance of (λgr/2)·(n+(½)) (n=0, 1, 2, . . . ) from a wall surface of axial one end of the internal space of the resonator body 10 or from the surface of one of the short plates 12a and 12b (more generally, the surface where the electric field strength is zero at one axial end of the resonator body 10).

Moreover, since the electro-magnetic field of the microwave in the resonator body 10 is in the $TE_{102}$ mode in this embodiment, the electric field strength of the microwave on the cross section of the resonator body 10 does not change in the vertical direction of the resonator body 10, but has a waveform having one loop in the crosswise direction. Therefore, the electric field distribution on the cross section of the resonator body 10 in the position of the maximum or almost maximum electric field strength of the microwave in the axial direction of the resonator body 10 is substantially as indicated by a sinusoidal wave b in FIG. 2. In this instance, the electric field strength in the crosswise direction of the resonator body 10 is maximum on the axis passing through the center of the sinusoidal wave b and the electric field strength on the axis does not change in the vertical direction of the resonator body 10.

The microwave supply means 4 supplies the microwave (1 GHz) to be resonated in the internal space of the resonator body 10 to the resonator body 10. The microwave supply means 4 includes a microwave oscillator 16 for outputting the microwave, a microwave amplifier 17, an isolator 18, and a connector 19 mounted on the resonator body 10. The microwave oscillator 16, the microwave amplifier 17, and the isolator 18 are disposed outside the resonator body 10 and the output side of the microwave oscillator 16 is connected to the connector 19 via the microwave amplifier 17 and the isolator 18. The isolator 18 has a function of permitting transmission of the microwave from the microwave amplifier 17 to the connector 19 and preventing transmission from the connector 19 to the microwave amplifier 17.

The microwave supply means 4 amplifies the microwave output from the microwave oscillator 16 by the microwave amplifier 17 and then inputs it to the connector 19 through the isolator 18.

The connector 19 has a function of an antenna for radiating the input microwave into the resonator body 10 and it is made of, for example, a SMA connector (SMA: Subminiature type A) as a coaxial connector. The connector 19 is mounted on the resonator body 10 in such a way that its radiant section 100 faces the internal space (specifically, the space between the short plates 12a and 12b) of the resonator body 10. In the shown example, the connector 19 is mounted on the wall on one end side of the resonator body 10 in the vertical direction thereof and is imposed between the half bodies 10a and 10b of the resonator body 10.

The actual cavity length Lr is adjusted by moving the short plates 12a and 12b as described above during the operation of the microwave oscillator 16 (while the microwave is radiated from the radiant section 100 of the connector 19 into the internal space of the resonator body 10). In some cases, a return electro-magnetic wave (microwave) from the internal space of the resonator body 10 to the connector 19 increases at that time. The isolator 18 is for use in preventing the return electro-magnetic wave from propagating through the microwave amplifier 17 or the microwave oscillator 16 so as to prevent the microwave amplifier 17 or the microwave oscillator 16 from being damaged by the return electro-magnetic wave.

More specifically, the microwave oscillator 16 and the microwave amplifier 17 can be known power devices (for example, GaN power device, SiC power device, and so on). These power devices are advancing rapidly in downsizing and price reduction in recent years. Therefore, by using these power devices, the microwave oscillator 16 and the microwave amplifier 17 can be formed in compact size at low cost. Additionally, the microwave oscillator 16 can be integrally formed with the microwave amplifier 17.

The gas cell 6 is formed in an enclosed tubelike shape and is housed in the resonator body 10 with the central axis directed along the vertical direction of the resonator body 10. The gas cell 6 encloses a medium of the type selected to achieve a laser beam having a desired wavelength (the medium is hereinafter referred to as a laser medium in the description of this embodiment). Unlike the laser tube (gas tube) of the conventional discharge excitation gas laser, the gas cell 6 is of an electrodeless structure without any electrode for causing a discharge.

In general, the material of the gas cell 6 preferably transmits the microwave to be resonated in the internal space of the resonator body 10 without loss and has transparency to the laser beam of the desired wavelength oscillated in the gas cell 6. Regarding the transparency to the laser beam, only the window portions of the gas cell 6 transmitting the laser beam (both end surfaces of the gas cell 6 in this embodiment) can be transparent to the laser beam. Since the gas cell 6 is heated by the microwave together with the inside laser medium to a high temperature (for example, 600° C.), it is also required to have a heat resistance. Furthermore, the gas cell 6 is preferably unresponsive to the laser medium excited inside the gas cell. Therefore, the material of the gas cell 6 is selected in consideration of these requirements. In this embodiment, the gas cell 6 is formed of quartz glass in consideration of these requirements. The gas cell 6 formed of quartz glass has transparency to an electro-magnetic wave in a wide range of wavelength regions including ultraviolet, visible light, infrared, THz, and microwave regions and is superior in heat resistance. Furthermore, the gas cell 6 is hardly responsive to various laser mediums. In this embodiment, the gas cell 6 is 100 mm in length, 10 mm in outer diameter, and 8 mm in inner diameter (1 mm in wall thickness), for example.

Additionally, if the laser beam oscillated in the gas cell 6 has a wavelength in the infrared or far-infrared region, ZnSe, high-resistance Si (fabricated by the floating zone method), or sapphire is appropriately selected as the material (window material) of the window portions (both end surfaces) of the gas cell 6, because these window materials have higher transparency to the light in the infrared or far-infrared region than the quartz glass. The material Si and sapphire have high transparency to microwaves and high heat resistance. Therefore, the entire gas cell 6 can be formed of one of these materials. This, however, leads to increasing the cost of the gas cell 6. Thus, it is preferable to form only the window portions using Si or sapphire. If the laser beam has the wavelength in the visible light region or the ultraviolet region, quartz glass is more preferable than sapphire as the material of the gas cell 6. In this manner, the material more preferably satisfying the above requirements is selected for the gas cell 6 according to the wavelength of the light to be generated by exciting the inside medium (in other words, according to the medium type).

Furthermore, the gas cell 6 is preferably disposed in a position where the laser medium is efficiently excited by the microwave in the internal space of the resonator body 10 in order to cause the laser oscillation (induced emission) of the laser medium enclosed inside the gas cell 6. In addition, the gas cell 6 is preferably disposed in a position where the entire laser medium is equally heated and excited without occurrence of local heating or excitation of the laser medium in the gas cell 6 as far as possible.

In this instance, the electric field strength of the microwave in the internal space of the resonator body 10 in the axial direction of the resonator body 10 is maximum or almost maximum in the position at a distance of $\lambda gr/4$ or $3\lambda g/4$ from the wall surface at axial one end of the internal space of the resonator body 10 or the surface of one of the short plates 12a and 12b in the axial direction of the resonator body 10 in this embodiment as described above. The electric field strength on the cross section of the resonator body 10 in the position is maximum on the axis passing through the center of the sinusoidal wave b (See FIG. 2) in the crosswise direction of the resonator body 10. Furthermore, the electric field strength on the axis does not change in the vertical direction.

Therefore, in this embodiment, the gas cell 6 is disposed in the resonator body 10 in the position (or in the vicinity thereof) a distance of $\lambda gr/4$ from the wall surface on one axial end side (the wall surface at the end on the short plate 12a side) of the internal space of the resonator body 10 in such a way that the central axis of the gas cell 6 is substantially coincident with the medial axis of the sinusoidal wave b (the axis passing through the center of the cross section of the resonator body 10 and parallel to the vertical direction of the resonator body 10).

The gas cell 6 disposed in this position enables the laser medium in the gas cell 6 to be equally and efficiently heated and excited independently of the position in the central axis direction of the gas cell 6 by means of the microwave in the resonator body 10. In addition, the unevenness of the temperature distribution does not occur and a local low temperature hardly occurs in the gas cell 6. Therefore, if the metal vapor is used as the laser medium, it is possible to prevent the deposition of the metal vapor on the inner surface of the gas cell 6 during laser oscillation.

As described above, the gas cell 6 disposed in the resonator body 10 is mounted on the resonator body 10 as described below in this embodiment.

Specifically, as shown in FIG. 1, a pair of gas cell hold members 22a and 22b each having an approximately tubular form are attached coaxially to vertical both ends of the resonator body 10 (the upper end and the lower end in FIG. 1) with their central axes directed in the vertical direction of the resonator body 10. The gas cell hold members 22a and 22b are each interposed between the half bodies 10a and 10b at each vertical end of the resonator body 10. Moreover, the gas cell hold members 22a and 22b are inserted into the internal space of the resonator body 10 at one end and are protruding outside the resonator body 10 at the other end. The gas cell hold members 22a and 22b are then caught together on the outer surface of the resonator body 10 through a flange 23 formed in the outer circumference of the other end of the gas cell hold members 22a and 22b. A through-hole is formed along the central axis of each of the gas cell hold members 22a and 22b in such a way that a large diameter hole 24 at one end (the inside of the resonator body 10) of the gas cell hold members 22a and 22b coaxially communicates with a small diameter hole 26 at the other end (the outside of the resonator body 10) of the gas cell hold members 22a and 22b. The diameter of the large diameter hole 24 is substantially the same as the outer diameter of the gas cell 6 and the diameter of the small diameter hole 26 is smaller than the large diameter hole 24. The ends of the gas cell 6 are engaged into the large diameter holes 24 of the gas cell hold members 22a and 22b so as to be freely insertable into or removable from the large diameter holes 24. This enables the gas cell 6 to be mounted on the resonator body 10 through the gas cell hold members 22a and 22b between which the gas cell 6 is fitted at both ends thereof. In this condition, the gas cell hold members 22a and 22b can be detached from the resonator body 10 together with the gas cell 6 by dividing the resonator body 10 into the two half bodies 10a and 11b. Furthermore, the gas cell 6 can be replaced by pulling out the gas cell hold members 22a and 22b from the gas cell 6. In this way, the gas cell 6 is replaceably mounted on the resonator body 10 of the microwave resonator 2.

The gas cell hold members 22a and 22b are formed of a material absorbing less microwave radiation such as, for example, Teflon™, glass, or metal.

In addition, the small diameter hole 26 of the gas cell hold members 22a and 22b functions as a light lead-out hole for leading the laser beam oscillated in the gas cell 6 from the internal space of the resonator body 10 to the outside thereof and it is located on the optical axis of the laser beam. Hereinafter, the small diameter hole 26 is referred to as a laser beam lead-out hole 26 in some cases.

The diameter of the laser beam lead-out hole 26 is set to a value that can prevent the microwave in the internal space of the resonator body 10 from being released to the outside through the laser beam lead-out hole 26. In this case, assuming that $\phi$ is the diameter of the laser beam lead-out hole 26, the microwave can be fully prevented from being released to the outside through the laser beam lead-out hole 26 from the internal space of the resonator body 10 by setting $\phi$ in such a way as to satisfy the condition $\lambda c/2 > \phi$. More specifically, $\lambda c/2$ is 12.5 cm since the cutoff wavelength $\lambda$ of the microwave resonator 2 is set to 25 cm as described above in this embodiment. Therefore, the diameter $\phi$ of the laser beam lead-out hole 26 only need be set smaller than 12.5 cm. In addition, the laser beam has directivity and the beam diameter is small. Therefore, even 5 mm or less is sufficient as the diameter $\phi$ of the laser beam lead-out hole 26 to lead the laser beam to the outside of the resonator body 10. Thus, the diameter $\phi$ of the laser beam lead-out hole 26 is set to 5 mm, for example, in this embodiment.

Regarding the laser medium (gas or vapor) enclosed in the gas cell 6, various generally known laser mediums for a gas laser can be used. In this embodiment, the type of laser medium is selected according to a desired wavelength of the laser beam to be oscillated in the gas cell 6. Thereafter, the selected laser medium is previously enclosed into the gas cell 6 in such a way as to achieve an appropriate pressure (the pressure capable of efficiently oscillating the laser beam having the desired wavelength) in the gas cell 6 at the laser oscillation.

Note here that it is known that the law of similarity expressed by the following equation (2) is generally satisfied in the gas laser between the inner diameter D of an appropriate laser tube (gas tube) and the pressure p of the laser medium:

$$pD=c \qquad (2)$$

where c is a constant determined according to the type of the laser medium. Therefore, the laser medium only need be enclosed in the gas cell 6 in such a way that the equation (2) is satisfied before the laser oscillation. In this case, D in the equation (2) is the inner diameter (8 mm in this embodiment) of the gas cell 6.

More specifically, if the gas laser 1 in this embodiment is formed as a He—Ne laser for oscillating a laser beam having a visible wavelength of, for example, 632.8 mm, a gas mixture of 5:1 ratio of He and Ne (He:Ne=5:1) is enclosed in the gas cell 6 at a pressure p satisfying a condition such as, for example, pD=4.0 Torr-mm (=533 Pa-mm). In the above, 1 Torr=133.322 Pa.

Furthermore, if the gas laser 1 is formed as a He—Cd laser (helium-cadmium laser) for oscillating a laser beam having a ultraviolet wavelength of, for example, 325 nm, Cd (metal) as a laser medium is enclosed in the gas cell 6 in such a way that the vapor pressure of Cd at laser oscillation in the gas cell 6 is, for example, in the order of $2.2\times10^{-2}$ Torr (=2.9 Pa) and He as a buffer gas is enclosed in the gas cell 6 at a pressure p substantially satisfying a condition such as, for example, pD=50 Torr-mm (=$6.7\times10^3$ Pa-mm). Note that Cd to be enclosed in the gas cell 6 can be solid at room temperature since Cd in the gas cell 6 is heated and vaporized by the microwave in the internal space of the resonator body 10 at the laser oscillation.

If the gas laser 1 is formed as a $CO_2$ laser (carbon dioxide gas laser) for oscillating a laser beam in the infrared region of 9 to 11 μm, a gas mixture of 8:1:1 to 12:3:1 ratio of He:$N_2$:$CO_2$ is enclosed in the gas cell 6 at a pressure in the order of 50 Torr and excited by the microwave.

In this embodiment, it is also possible to form a Ne laser (oscillation wavelength: 0.3 to 150 μm), a He laser (oscillation wavelength: 95.78 μm, 216.3 μm), a water vapor laser (oscillation wavelength: 27.97 μm to 220 μm), a HCOOH laser (oscillation wavelength: 390 μm to 520 μm), and a HCN laser (oscillation wavelength: 310 μm to 340 μm) for oscillating a laser beam having a wavelength in the THz region. In this case, for example, taking the water vapor laser as an example, water ($H_2O$) as a laser medium is enclosed in the gas cell 6 in such a way that the water vapor pressure at the laser oscillation is, for example, in the order of $2.2\times10^{-1}$ Torr (=29.3 Pa), and He as a buffer gas is enclosed in the gas cell 6 at a pressure p substantially satisfying a condition such as, for example, pD=10 Torr-mm (=$1.3\times10^3$ Pa-mm).

As described above, various types of laser mediums can be selected to be enclosed in the gas cell 6. The gas laser in this embodiment is capable of oscillating a laser beam having a wide range of wavelengths from the ultraviolet region to the THz region.

More specifically, the laser beam having a wavelength in the THz region is oscillated by using the transition between the molecular vibrations of the laser medium, and therefore the oscillation wavelength of the laser beam can also be changed by using isotopes of the atoms that make up the molecule of the laser medium. For example, in the formation of the water vapor laser, the wavelength of the laser beam can be changed from 27.97 μm to 50.3 μm by using water vapor ($D_2O$) in which hydrogen atoms of a water molecule are replaced by deuterium atoms.

The laser resonator 8 causes an induced emission of the laser medium excited in the gas cell 6 to accelerate the laser oscillation and outputs the laser beam to the outside of the resonator body 10 with the optical axis of the laser beam generated by the laser oscillation directed in a predetermined direction (in the central axis direction of the gas cell 6 in this embodiment). The laser resonator 8 includes mirror holders 28a and 28b attached to the gas cell hold members 22a and 22b, respectively, in the outside of the resonator body 10 and laser resonator mirrors 30a and 30b held by the mirror holders 28a and 28b, respectively.

In this case, one of the laser resonator mirrors 30a and 30b such as, for example, the laser resonator mirror 30a reflects 100% (totally reflects) a laser beam incident on the mirror passing through the laser beam lead-out hole 26 of the gas cell hold member 22a, and the other laser resonator mirror 30b transmits a part of a laser beam incident on the mirror passing through the laser beam lead-out hole 26 of the gas cell hold member 22b and reflects the remainder. Therefore, the laser beam generated in the gas cell 6 repeats the reflection and interference between the laser resonator mirrors 30a and 30b, while a part of the laser beam passes through the laser resonator mirror 30b and is output to the outside of the resonator body 10. In this case, the reflectance of the laser resonator mirror 30b transmitting a part of the laser beam is determined in consideration of a loss that occurs in the laser resonator 8 and set within the range of substantially 98% to 70%.

The laser resonator mirrors 30a and 30b are attached to the mirror holders 28a and 28b in such a way that their tilts and the distance (the cavity length of the laser resonator 8) between the laser resonator mirrors 30a and 30b can be adjusted. Moreover, by previously adjusting them appropriately, the induced emission of the laser medium occurs after the laser medium is excited in the gas cell 6. This causes the laser oscillation in the gas cell 6 and generates a laser beam. A part of the laser beam is then output through the laser resonator mirror 30b of the laser resonator mirrors 30a and 30b. In this case, the optical axis of the laser beam is, as shown in FIG. 1 and FIG. 2, along the central axis direction of the gas cell 6 (the vertical direction of the resonator body 10).

While the laser resonator mirrors 30a and 30b have been disposed outside the resonator body 10 in this embodiment, they can also be disposed inside the resonator body 10. To easily adjust the tilts of the laser resonator mirrors 30a and 30b and the distance therebetween, however, it is preferable to dispose the laser resonator mirrors 30a and 30b outside the resonator body 10 as described in this embodiment.

In addition, to reduce the reflection loss of the laser beam, it is preferable to attach a quartz glass plate in the laser beam pass-through portion of the gas cell 6 (both ends of the gas cell 6 in this embodiment) in order to keep a Brewster's angle. Thereby, the laser beam can be output more efficiently.

If an ultraviolet or far-infrared laser beam is oscillated, water vapor or other gas components existing in the gap between each end surface of the gas cell 6 and the laser resonator mirror 30a or 30b strongly absorb the ultraviolet or far-infrared light, which causes a loss in the resonator and disturb the laser oscillation. If it is required to oscillate a laser beam having a wavelength susceptible to absorption in the air, it is necessary to form a vacuum in the internal space of the entire microwave resonator 2 or to let the laser resonator mirrors 30a and 30b be the end surfaces of the gas cell 6 in order to avoid the problem. Particularly, if the laser resonator mirrors 30a and 30b are adapted to be the end surfaces of the gas cell 6, it is necessary to impose metal flexible rings between the laser resonator mirrors 30a and 30b and the gas cell 6, respectively, so that the angles of the laser resonator mirrors 30a and 30b can be adjusted. The glass can be welded with the metal flexible ring by a process referred to as metallization and therefore the above structure can be achieved relatively with ease.

Since the gas laser 1 in this embodiment is constituted as described above, a standing microwave is formed in the internal space of the resonator body 10 when the microwave oscillator 16 is activated with the gas cell 6 enclosing the laser medium mounted on the resonator body 10 as described above. Thereafter, the microwave heats and excites the laser medium in the gas cell 6 and thereby the laser oscillation occurs. Furthermore, a part of the laser beam generated by the laser oscillation passes through the mirror 30b of the laser resonator mirrors 30a and 30b of the laser resonator 8 and is output to the outside of the resonator body 10. If the laser medium is metal vapor such as Cd in this instance, a solid metal in the gas cell 6 is vaporized by being heated by the microwave, by which the metal vapor as the laser medium is generated in the gas cell 6. If the laser medium is, for example, water vapor, water (liquid) in the gas cell 6 is vaporized by being heated by the microwave, by which the water vapor as a laser medium is generated in the gas cell 6.

Since the gas cell 6 is disposed as described above in this condition, the laser medium in the gas cell 6 is efficiently and equally heated and excited. Furthermore, the temperature in the gas cell 6 is equal and a local low temperature zone does not exist. Therefore, even if metal vapor is used as a laser medium, the metal vapor is prevented from being deposited on the inner surface of the gas cell 6. Thus, the energy can be equally and stably supplied from the microwave to the laser medium. Therefore, the laser beam can be output efficiently and stably.

In addition, the gas cell 6 can be easily replaced as described above, and thereby the laser medium can be easily changed to various types of laser mediums. Thus, it becomes possible to oscillate a laser beam at various wavelengths in a wide range of wavelength regions from the ultraviolet region to the THz region.

Furthermore, since the gas cell 6 has an electrodeless structure, it is hardly deteriorated or damaged. Therefore, the life of the gas cell 6 can be remarkably elongated in comparison with the conventional gas laser tube. For example, the gas cell 6 of the gas laser 1 in this embodiment can secure a life of 30000 hours or longer.

Moreover, since the microwave is used to excite the laser medium instead of discharging, the efficiency of laser beam oscillation can be improved in comparison with the conventional discharge excitation gas laser.

Furthermore, since high-power and compact semiconductor power devices can be used as the microwave oscillator 16 and the microwave amplifier 17, there is no need to prepare a large power supply as has been required in the conventional gas laser. Therefore, the compact and high-power gas laser 1 can be provided at low cost.

Still further, the laser beam having a wavelength in the THz-wave region can be generated and output by using He, Ne, water vapor, HCOOH, or HCN as a laser medium. Therefore, a simple, compact, and long-life light source in the THz-wave region can be provided at low cost.

Although the laser beam is continuously output in the gas laser 1 according to the embodiment described hereinabove, it can also be adapted to output a pulsing laser beam by providing the laser resonator with a device having a well-known Q switch function or mode-locking function. In this case, two or more laser resonator mirrors can also be provided.

Figure 3:
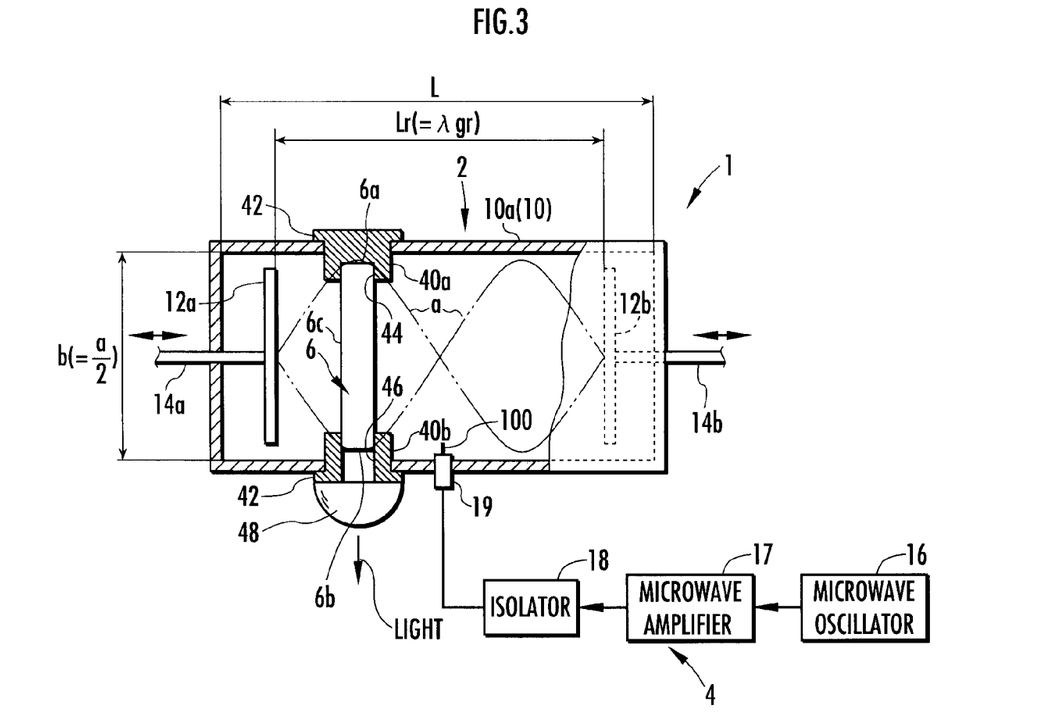
FIG. 3 is a diagram showing a configuration of a lighting system according to a second embodiment of the present invention.
Figure 4:
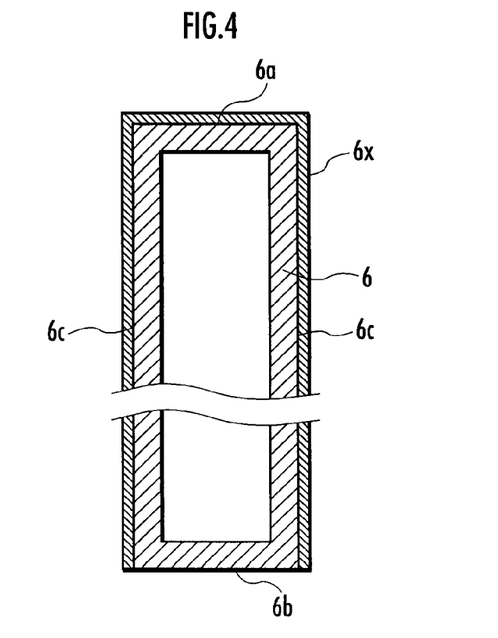
FIG. 4 is a cross section of a gas cell included in the lighting system shown in FIG. 3.

Subsequently, a second embodiment of the present invention will be described below with reference to FIG. 3 and FIG. 4. FIG. 3 shows a diagram showing a configuration of a lighting system according to this embodiment. FIG. 4 shows a cross section of a gas cell included in the lighting system. This embodiment differs from the first embodiment in only a part of the configuration. Therefore, the same reference numerals are used for the same components as those in the first embodiment, and their detailed description is omitted here.

Referring to FIG. 3, a lighting system 1' in this embodiment is adapted to output light generated by exciting a medium in a gas cell 6 directly (without laser oscillation) to the outside of a resonator body 10 of a microwave resonator 2 by removing a laser resonator 8 from the gas laser 1 of the first embodiment. Hereinafter, the configuration of the lighting system 1' will be described, focusing on the differences from the gas laser 1 of the first embodiment.

In the lighting system 1', the gas cell 6 is mounted on the resonator body 10 through gas cell hold members 40a and 40b different in structure from the gas cell hold members 22a and 22b of the first embodiment. The gas cell hold members 40a and 40b have the same external shapes as those of the gas cell hold members 22a and 22b in the first embodiment, respectively, and they are attached to the vertical ends (the upper end and the lower end in FIG. 3) of the resonator body 10 in the same manner as the gas cell hold members 22a and 22b in the first embodiment. Specifically, the gas cell hold members 40a and 40b are coaxially attached to the vertical ends of the resonator body 10 with their central axes directed in the vertical direction of the resonator body 10. The gas cell hold members 40a and 40b are interposed between half bodies 10a and 10b of the resonator body 10 at the vertical ends of the resonator body 10 with one end inserted into the internal space of the resonator body 10 and the other end protruding to the outside of the resonator body 10. The gas cell hold members 40a and 40b are caught together on the outer surface of the resonator body 10 each through a flange 42 formed in the outer circumference of the other end of the gas cell hold members 40a and 40b. The material of the gas cell hold members 40a and 40b is the same as that of the gas cell hold members 22a and 22b in the first embodiment.

On the other hand, a through-hole is not formed along the central axis of the gas cell hold member 40a out of the gas cell hold members 40a and 40b in this embodiment, but a concave portion 44 having substantially the same diameter as the outer diameter of the gas cell 6 is formed in the center of the end surface on the inside of the resonator body 10. Accordingly, the gas cell hold member 40a has such a structure that the small diameter hole 26 of the gas cell hold member 22a is filled in the structure of the first embodiment. Therefore, one end of the gas cell 6 is held by engaging one end (the upper end in FIG. 3) of the gas cell 6 into the concave portion 44 in such a way that it can be freely insertable into or removable from the recess portion 44.

In addition, a through-hole 46 having substantially the same diameter as the outer diameter of the gas cell 6 is formed in the gas cell hold member 40b along the central axis thereof. The other end (the lower end in FIG. 3) of the gas cell 6 is engaged into the through-hole 46 in such a way as to be freely insertable into or removable from the through-hole 46, by which the other end of the gas cell 6 is held. Therefore, the through-hole 46 is opposed to the gas cell 6 coaxially. For this reason, the light generated by exciting the medium in the gas cell 6 passes through the through-hole 46 of the gas cell 6 and is output from the inside of the resonator body 10 to the outside thereof. In other words, the through-hole 46 functions as a light lead-out hole in the present invention.

The through-hole 46 of the gas cell hold member 40b can also be formed into a shape having a diameter expansion surface from the inside of the resonator body 10 toward the outside thereof, for example.

More specifically, the diameter 4 of the through-hole 46 (light lead-out hole) is set so as to satisfy the condition of $\lambda c/2 > \phi$ as described in the first embodiment in order to fully prevent the microwave from being released from the internal space of the resonator body 10 to the outside through the laser beam lead-out hole 26. In this case, the outer diameter of the gas cell 6 in this embodiment is the same (10 mm) as the first embodiment and therefore the diameter $\phi$ of the through-hole 46 is also in the order of 10 mm. The cutoff wavelength of the resonator body 10 in this embodiment is the same (25 cm) as the first embodiment. Therefore, the condition λc/2>φ is fully satisfied and the microwave (the microwave of 1 GHz) in the resonator body 10 can be sufficiently prevented from being released through the through-hole 46 to the outside.

In this embodiment, a reflective coating layer 6x for reflecting the light generated in the gas cell 6 is formed on an end surface 6a on the gas cell hold member 40a side and an outer peripheral surface 6c of the gas cell 6 out of the outer surface of the gas cell 6, in other words, the outer surface except for an end surface 6b on the gas cell hold member 40b side of the gas cell 6 as shown in FIG. 4. The reflective coating layer 6x is for use in preventing the light generated in the gas cell 6 from being released to the internal space of the resonator body 10 so as to prevent the light from being led out to the outside from one end surface 6b of the gas cell 6 through the through-hole 46 wherever possible. Although the reflective coating layer 6x is shown as a considerable thick layer in FIG. 4 for convenience of illustration, actually it is substantially thin layer.

In general, a material selected for the reflective coating layer 6x fully reflects the light generated by exciting the medium in the gas cell 6 and fully transmits the microwave in the resonator body 10.

More specifically, if the light generated in the gas cell 6 is in the visible light region, the reflective coating layer 6x can be formed by coating, for example, Teflon™ with a thickness of 1 to 10 μm or so on the outer surface except for the end surface 6b of the gas cell 6.

Still further, if the light generated in the gas cell 6 is in the ultraviolet region, the reflective coating layer 6x can be formed by coating, for example, ceramic particles of barium sulfate ($BaSO_4$) on the outer surface except for the end surface 6b of the gas cell 6.

Alternatively, the inside of the microwave resonator 2 (the inner surface of the resonator body 10) may be coated with a high-reflectance metal film that reflects almost 100% of the light generated in the gas cell 6. In this case, if the generated light is ultraviolet, silver coating is effective. If it is infrared or far-infrared, gold coating is effective. As described above, it becomes possible to eject more intensive light from the through-hole 46 by keeping the condition of no absorption loss of the light generated in the microwave resonator 2.

In addition, a condenser lens 48 is attached to the outer surface of the resonator body 10 at the place of the through-hole (light lead-out hole) 46 in this embodiment. In this embodiment, the condenser lens 48 is detachably attached to the flange 42 of the gas cell hold member 40b. The condenser lens 48 is for use in condensing the light that passes through the end surface 6b of the gas cell 6 and the through-hole 46 and is led out from the inside of the gas cell to the outside thereof.

The condenser lens 48 is formed of a material having high transparency to the light generated in the gas cell 6. Specifically, if the light generated in the gas cell 6 is in the visible light region or in the ultraviolet region, the condenser lens 48 can be formed of, for example, quartz glass. If the light generated in the gas cell 6 is in the infrared region, the condenser lens 48 can be formed of, for example, ZnSe, Si crystal, or Ge crystal. Moreover, if the light generated in the gas cell 6 is in the THz-wave region, the condenser lens 48 can be formed of, for example, Si, polyethylene, quartz glass, Teflon™, polycarbonate, acrylic, polypropylene, or acetal.

The constituents other than described above (including the configuration of the microwave resonator 2, the size of the resonator body 10, the material of the gas cell 6, the disposed position of the gas cell 6, the type of the medium in the gas cell 6, and the enclosure form of the medium) are the same as in the first embodiment.

Since the lighting system 1' in this embodiment is configured as described above, a standing microwave is formed in the internal space of the resonator body 10 when the microwave oscillator 16 is activated with the gas cell 6 enclosing the medium mounted on the resonator body 10 in the same manner as in the first embodiment. Then, the microwave heats and excites the medium in the gas cell 6 and thereby light is generated. The generated light passes through the through-hole 46 (light lead-out hole) from one end surface 6b of the gas cell 6 and is released to the outside of the resonator body 10. Furthermore, the light is condensed by the condenser lens 48 and then radiated from the condenser lens 48.

In this condition, the gas cell 6 is disposed in the resonator body 10 in the same manner as in the first embodiment and therefore the medium in the gas cell 6 is efficiently and equally heated and excited. In addition, the temperature in the gas cell 6 is equal without any local low temperature zone. Therefore, if metal vapor is used as the medium, the metal vapor is prevented from being deposited on the inner surface of the gas cell 6. This enables equal and stable energy supply from the microwave to the medium. Therefore, the excitation of the medium and the light emission can be efficiently and stably performed.

Furthermore, the reflective coating layer 6x is formed on the outer surface except for one end surface 6b (the window portion) of the gas cell 6. Thereby, the light generated in the gas cell 6 is released to the outside of the resonator body 10, passing through the through-hole 46, from the one end surface 6b of the gas cell 6 without being scattered and lost wastefully in the resonator body 10. The released light is then condensed by the condenser lens 48. Therefore, the fully intensive light can be led out to the outside of the resonator body 10.

In addition, the gas cell 6 can be easily replaced similarly to the first embodiment and thus can be easily replaced with various types of mediums. Therefore, it is possible to obtain lights of various wavelengths in a wide range of wavelength regions from the ultraviolet region to the THz-wave region.

Furthermore, since the gas cell 6 has the electrodeless structure, it is hardly deteriorated or damaged. Therefore, the life of the lighting system 1' of this embodiment can be elongated.

Furthermore, high-power and compact semiconductor power devices can be used as the microwave oscillator 16 and the microwave amplifier 17. Therefore, the compact and high-power lighting system 1' can be provided at low cost.

Still further, light having a wavelength in the THz-wave region can be generated and output by using He, Ne, water vapor, $CH_3OH$, HCOOH, or HCN as a medium. Therefore, a simple, compact, and long-life light source in the THz-wave region can be provided at low cost.

Figure 5:
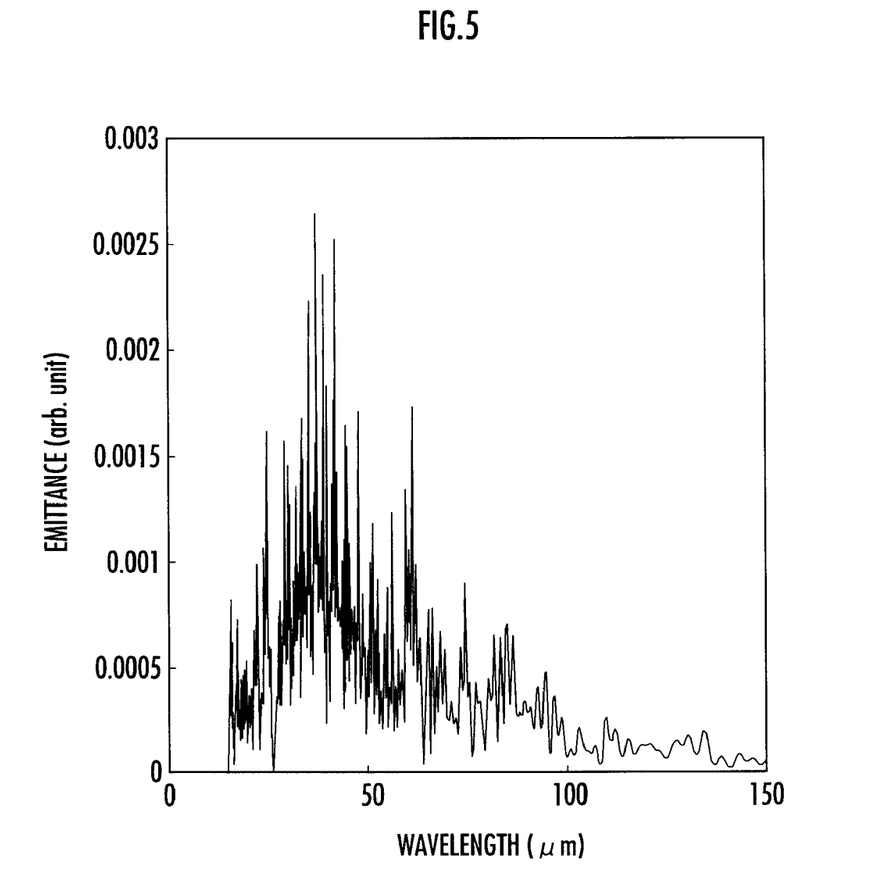
FIG. 5 is a diagram showing an example of an emission spectrum in the THz region when a He—Ne gas is used in the second embodiment of the present invention.

FIG. 5 shows an emission spectrum in the THz region, which is obtained under the conditions of a gas pressure of $1.2 \times 10^2$ Pa and a microwave power of 500 W by using a He—Ne gas (He:Ne=5:1). As shown in FIG. 5, a lot of very sharp spectral lines are observed. All of them are observed in the emission spectrum of neutral Ne atoms. The spectrum identification is described, for example, in the literature "PROGRESS IN QUANTUM ELECTRONICS" (Volume 1/Edited by J. H. Sanders and K. W. H. Stevens/PERGAMON PRESS).

Figure 6A:
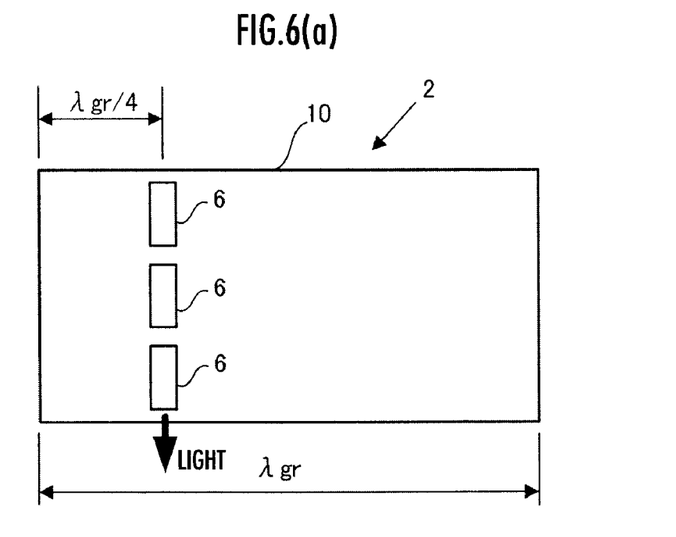
FIGS. 6(a) and (b) are diagrams schematically showing explanations of the arrangement of the plurality of gas cells in the microwave resonator.
Figure 6B:
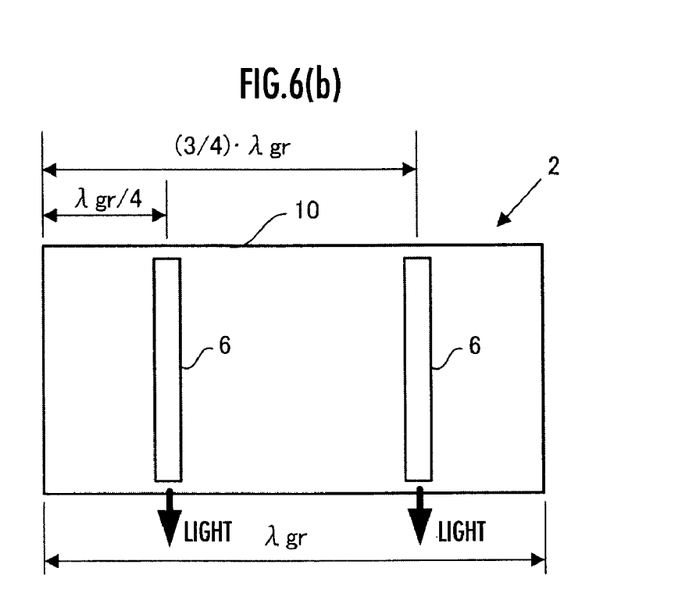

Although the single gas cell 6 has been disposed in the microwave resonator 2 in the embodiments, a plurality of gas cells 6 can be disposed in the microwave resonator 2, for example, as illustrated in FIG. 6(a) and FIG. 6(b). FIG. 6(a) and FIG. 6(b) schematically show examples of the arrangement of the plurality of gas cells 6 in the microwave resonator 2, respectively. In FIG. 6(a) and FIG. 6(b), the short plate is not shown, and the axial length of the resonator body 10 is assumed to be equal to the actual resonator wavelength λgr of the microwave led into the resonator body 10.

In the example shown in FIG. 6(a), the plurality of gas cells 6 (three gas cells 6 in FIG. 6(a)) are disposed in a line (in series) on a cross section perpendicular to the central axis of the resonator body 10. In this arrangement, the gas cells 6 are disposed in positions, for example, a distance of λgr/4 from one end (a plane where the electric field strength of the microwave is zero) of the resonator body 10 in the axial direction of the resonator body 10, in other words, positions corresponding to the maximum electric field strength. Also, the plurality of gas cells 6 can be disposed in positions at the distance of λgr/4 from the other end of the resonator body 10. Regarding the structure of mounting the gas cells 6 on the resonator body 10, the gas cells 6 can be mounted on the resonator body 10, for example, by connecting the plurality of gas cells 6 in series through members of the same material as the gas cell hold members 22a, 22b and then fitting the ends of the connected gas cells on the resonator body in the same manner as in FIG. 1 or FIG. 3.

In the example shown in FIG. 6(b), the plurality of gas cells 6 (two gas cells 6 in FIG. 6(b)) are disposed in parallel spaced apart from each other in the axial direction of the resonator body 10. In this arrangement, the gas cells 6 are disposed with the central axes directed in the direction perpendicular to the central axis of the resonator body 10. These gas cells 6 are disposed, for example, in positions at a distance of λgr/4 and at a distance of (3/4)·λgr from one end (a plane where the electric field strength of the microwave is zero) of the resonator body 10 in the axial direction of the resonator body 10. In other words, the two gas cells 6 are disposed in two positions corresponding to the maximum electric field strength in the axial direction of the resonator body 10, respectively. The structure of mounting the gas cells 6 on the resonator body 10 can be the same as in FIG. 1 or FIG. 3.

If the plurality of gas cells 6 are provided as described above, laser beams of multiple different wavelengths can be oscillated or emitted by using different types of mediums in the gas cells 6.

Although the microwave has the frequency of 1 GHz in the above embodiments, the microwave having a different frequency can be used. For example, a microwave having a higher frequency can be used. The higher the frequency of the microwave used, the shorter the cavity length of the resonator body 10, then the microwave resonator 2 can be smaller. For example, if the microwave of 10 GHz is used, the entire volume of the microwave resonator 2 can be reduced to 1/1000(1/10×1/10×1/10) or so of that required when the microwave of 1 GHz is used. Therefore, it is also possible to provide a compact and high-power gas laser having dimensions of, for example, 10×10×10 cm or smaller.

In addition, the frequency of the microwave used can be dependent on the type of the medium.

Although the $TE_{102}$ mode is used as the electro-magnetic field mode of the microwave in the microwave resonator 2 in the above embodiments, other electro-magnetic field mode can be used, too.

If so, the optimum position of the gas cell 6 in the microwave resonator 2 appropriately changes according to the electro-magnetic field mode of the microwave resonator 2 and therefore it is necessary to set the disposed position of the gas cell 6 in consideration of this.

Furthermore, although the resonator that has the rectangular cross section (rectangular cavity resonator) is used as the resonator body 10 of the microwave resonator 2 in the above embodiments, it is also possible to use a circular cavity resonator having a circular cross section, a doughnut-shaped cavity resonator having a doughnut-shaped cross section, or a concave cavity resonator having a concave cross section. Any of these resonators can be used to excite the medium in the gas cell and to emit light efficiently by disposing the gas cell in the position where the electro-magnetic field is maximum or in the vicinity thereof correspondingly to the electro-magnetic field mode of the microwave in the internal space of the resonator.

Furthermore, although the gas cell 6 is formed in a tubelike shape having a fixed diameter in the above embodiments, the gas cell 6 can be formed in such a shape that the diameter varies in the longitudinal direction (axial direction) of the gas cell such as, for example, a shape that the diameter is maximum in the intermediate part of the gas cell in the longitudinal direction.

What is claimed is:

1. A lighting system for generating light by exciting a medium such as gas or vapor, comprising:
   a microwave resonator having an internal space for generating a standing microwave;
   a microwave supply means for supplying the microwave into the internal space of the microwave resonator; and
   a gas cell enclosing the medium and disposed in the internal space of the microwave resonator,
   wherein the microwave generated by the microwave resonator is a standing wave of a linearly-polarized wave;
   wherein the gas cell is disposed in a position corresponding to a maximum electric field strength of the standing wave in the internal space of the microwave resonator or in the vicinity thereof, and in a direction parallel to the direction of the linearly-polarized wave, and
   the light is generated by exciting the medium in the gas cell using the standing microwave of the linearly-polarized wave generated in the internal space of the microwave resonator and wherein the generated light is output to the outside of the microwave resonator through a light lead-out hole provided in the microwave resonator.

2. The lighting system according to claim 1, wherein the gas cell is provided in a plural number and the gas cells are disposed in positions corresponding to the maximum electric field strength of the standing wave in the internal space of the microwave resonator or in the vicinity of the positions, with being spaced from each other in the central axis direction of the internal space.

3. The lighting system according to claim 1, wherein the gas cell is provided in a plural number and the gas cells are disposed in a line on a cross section of the internal space of the microwave resonator in positions corresponding to the maximum electric field strength of the standing wave in the internal space or in the vicinity of the positions.

4. The lighting system according to claim 1, wherein the microwave resonator has at least one short plate for adjusting a cavity length, which is the length of the internal space in the traveling direction of the standing microwave.

5. The lighting system according to claim 1, wherein the gas cell is replaceably mounted on the microwave resonator.

6. The lighting system according to claim 1, wherein the microwave supply means includes a microwave oscillator for outputting at least the microwave and an isolator interposed between the microwave oscillator and the microwave resonator, wherein the microwave supply means supplies the microwave resonator with the output from the microwave oscillator via the isolator.

7. The lighting system according to claim 1, wherein a laser resonator for resonating the light generated in the gas cell and oscillating the laser beam is mounted on the microwave resonator and the light lead-out hole is made in the microwave resonator on the optical axis of the laser beam.

8. The lighting system according to claim 1, wherein the light lead-out hole is made in the microwave resonator in a position opposite the gas cell.

9. The lighting system according to claim 8, wherein a reflective coating layer that reflects the light generated in the gas cell is formed on an outer surface of the gas cell except for one end.

10. The lighting system according to claim 8, wherein a condenser lens for condensing the light output through the light lead-out hole to the outside of the microwave resonator is mounted on the microwave resonator in the place of the light lead-out hole.

11. The lighting system according to claim 1, wherein the medium is of the type of generating light in the far-infrared region.

12. The lighting system according to claim 1, wherein the microwave generated by the microwave resonator is a standing wave of a linearly-polarized wave in which two opposing surfaces inside the microwave resonator are the only reflecting surfaces where the node of the standing wave is present.

13. The lighting system according to claim 1, wherein only one microwave supply means is provided.

14. The lighting system according to claim 12, wherein the microwave generated by the microwave resonator is a standing wave of a linearly-polarized wave having node at the two opposing surfaces inside the microwave resonator and at a median center thereof.

15. The lighting system according to claim 12, wherein the electric field of the microwave generated by the microwave resonator is a $TE_{102}$ mode.

16. The lighting system according to claim 1, wherein the gas cell is disposed in a position, or in the vicinity thereof, a distance of $(\lambda g/2) \cdot (n+(½))$ (n:0 or greater integer) from the position corresponding to zero electric field strength of the standing microwave at one end of the internal space of the microwave resonator, where μg is a guide wavelength as the wavelength of the standing microwave in the internal space of the microwave resonator.

* * * * *

UNITED STATES PATENT AND TRADEMARK OFFICE
CERTIFICATE OF CORRECTION

PATENT NO.       : 7,447,249 B2
APPLICATION NO.  : 11/464325
DATED            : November 4, 2008
INVENTOR(S)      : Takahiro Matsumoto et al.

It is certified that error appears in the above-identified patent and that said Letters Patent is hereby corrected as shown below:

In column 24, Line 21 (Claim 16, Line 6), Delete "μg" and Insert --λg--.

Signed and Sealed this

Thirtieth Day of December, 2008

JON W. DUDAS
*Director of the United States Patent and Trademark Office*